United States Patent
Wefringhaus et al.

(10) Patent No.: US 6,902,760 B2
(45) Date of Patent: Jun. 7, 2005

(54) AQUEOUS ONE-COAT RUBBER-METAL BONDING AGENTS

(75) Inventors: Rainer Wefringhaus, Hilden (DE); Hans-Joachim Purps, Meerbusch (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/462,311

(22) Filed: Jun. 13, 2003

(65) Prior Publication Data

US 2003/0232917 A1 Dec. 18, 2003

Related U.S. Application Data

(63) Continuation of application No. PCT/EP01/14265, filed on Dec. 5, 2001.

(51) Int. Cl.$^7$ .............................. B05D 5/10; C08K 5/32; C08K 5/35
(52) U.S. Cl. .................... 427/207.1; 427/289; 427/292; 427/388.2; 427/388.4; 524/95; 524/236
(58) Field of Search ................ 524/95, 236; 427/207.1, 427/289, 292, 388.2, 388.4

(56) References Cited

U.S. PATENT DOCUMENTS

| | | | |
|---|---|---|---|
| 3,258,389 A | * | 6/1966 | Coleman et al. ......... 156/307.5 |
| 4,124,554 A | | 11/1978 | Fry |
| 4,988,753 A | * | 1/1991 | Rullmann et al. .......... 524/260 |
| 5,200,455 A | | 4/1993 | Warren |
| 5,962,576 A | | 10/1999 | Dehnicke et al. |

FOREIGN PATENT DOCUMENTS

| | | |
|---|---|---|
| CA | 2 053 874 | 10/1990 |
| WO | WO 99/02583 A1 | 1/1999 |

OTHER PUBLICATIONS

Obtained translation of WO 00/37539 (Jun. 29, 2000), Dehnicke et al.*
"Standard Test Methods for Rubber Property—Adhesion to Rigid Substrates", ASTM D 429, ASTM International, pp. 1–20.
PCT abstract for WO 90/12847 (Nov. 1, 1990).
PCT abstract for WO 96/38510 (Dec. 5, 1996).
PCT abstract for WO 00/37539 (Jun. 29, 2000).

* cited by examiner

Primary Examiner—Matthew A. Thexton
(74) Attorney, Agent, or Firm—Stephen D. Harper; Brian J. Hubbard

(57) ABSTRACT

Aqueous bonding agents based on at least one phenolic resin, at least one aromatic dinitroso compound and a polyvinyl alcohol are suitable as a one-coat aqueous rubber-metal bonding agent to achieve permanent rubber-metal bonds. These bonding agents can be substantially free from organic solvents and halogen compounds, and allow one-coat application without an additional, previous application of a primer.

21 Claims, No Drawings

AQUEOUS ONE-COAT RUBBER-METAL BONDING AGENTS

This application is a continuation under 35 USC Sections 365(c) and 120 of International Application No. PCT/EP01/14265, filed Dec. 5, 2001, which claims priority from German Application No. DE 10062266.6, filed 14 Dec. 2000, each of which is incorporated herein by reference in its entirety.

FIELD OF THE INVENTION

The present invention relates to an aqueous bonding agent and to its use as a one-coat bonding agent for the production of rubber-metal bonds.

DESCRIPTION OF THE RELATED ART

For vulcanizing rubber mixtures onto vulcanization-stable substrates, particularly metals, special bonding agents are needed to achieve a permanent and load-bearing bond between the metal and the rubber. A large number of two-coat systems based on polymers in organic solvents are known for this purpose in the prior art. First, a so-called "primer" is generally applied on to the metal substrate. After the solvent has evaporated from this and it has optionally been stoved, the actual bonding agent is applied, the solvent of which must also evaporate and which may possibly have to be cured in a separate step; this curing sometimes takes place together with the vulcanization step of the rubber mixture.

For environmental protection reasons, water-based bonding agent systems that are free from or low in volatile organic solvents have increasingly been proposed recently.

Thus, WO 90/12847 describes an aqueous bonding agent dispersion for the vulcanization of rubber onto substrates that are stable under vulcanization conditions, containing a halogenated copolymer, a monoalkenyl-aromatic alkyl halide having an alkylating effect and polyfunctional aromatic nitroso compounds, pigments, carbon black, defoamers and emulsifiers and other auxiliary substances. According to the teaching of this document, the bond strength between the substrate and the vulcanized rubber is said to be improved and capped isocyanates omitted. According to the teaching of this document, it is useful to carry out a pretreatment with an adhesion-improving agent (primer) made of chlorinated rubber, phenolic resin or similar, before applying the bonding agent. A one-coat, aqueous bonding agent system free from halogen compounds is not proposed in this document.

From U.S. Pat. No. 5,200,455 an aqueous primer composition is known which contains a polyvinyl alcohol-stabilized aqueous phenolic resin dispersion and a latex of a halogenated polyolefin and metal oxide. While it is true that this aqueous primer composition reduces the use of organic solvents, they are still needed as solution aids. Furthermore, according to the teaching of this document, the application of a topcoat on to this primer coat is still necessary to achieve a permanent adhesive bond.

From WO 96/38510 a water-based adhesive agent containing an aqueous dispersion of one or more phenolic resins is known, which is stabilized by one or more polyacrylates. In addition, this agent contains one or more latexes of halogenated polyolefins and one or more crosslinking agents. This adhesive agent is applied to the substrates as a primer, to be followed by coating with a known cover cement and the substrate is then bonded with a rubber under vulcanization conditions.

No water-based bonding agents to be applied in one coat are therefore known in the prior art, nor are these free from halogenated compounds, so that the inventors set themselves the object of providing a water-based rubber-metal bonding agent to be applied in one coat, which is free from halogen-containing polymers or halogen-containing alkylating agents and low in volatile organic solvents or preferably free from organic solvents.

SUMMARY OF THE INVENTION

The present invention provides an aqueous bonding agent containing at least one phenolic resin, a polyfunctional aromatic nitroso compound and polyvinyl alcohol.

The present invention also provides the use of such a composition as a one-coat rubber-metal bonding agent to be applied without a primer.

The present invention also provides a process for the production of a rubber-metal bond with the following process steps:
a) application of the above-mentioned bonding agent composition onto a metal substrate,
b) drying and/or curing of the coating to achieve a dry film thickness of the bonding agent layer of 1 to 8 μm, for which purpose the coated substrate is optionally heated to temperatures of between 60 and 150° C.,
c) the coated substrate is then cut to pre-set dimensions and shaped, e.g., for the production of a U-shaped profile,
d) a rubber mixture, optionally being shaped for the final rubber profile, is then extruded by conventional means onto the metal part coated with the bonding agent, followed by
e) the vulcanization of the rubber mixture, optionally with simultaneous final curing of the bonding agent layer.

In this type of production process, the bonding agent is preferably applied directly onto the metal substrate in a coil-coating process.

Since the aqueous bonding agent according to the invention can be applied onto the metal substrate in one stage and no, or very few, organic solvents are released on drying, the coating of the metal substrate can also be applied with simple equipment at a later point in time. For this purpose, the metal substrate can first be cut and then coated with the bonding agent layer, followed, after the drying and/or curing of the bonding agent layer, by the shaping process as well as the extrusion of the rubber mixture and the vulcanization step. One advantage of this procedure is that in this case the cut edges of the metal substrate are also coated with the bonding agent.

DETAILED DESCRIPTION OF THE INVENTION

The preferred bonding agents according to the invention contain:

2 to 10 wt. %, preferably 2 to 8 wt. %, poly-p-dinitrosobenzene, 4 to 15 wt. % phenolic resin, 2 to 10 wt. %, preferably 2 to 8 wt. %, polyvinyl alcohol, optionally up to 15 wt. % of a water-soluble solvent as solubilizer, 0.5 to 5 wt. % of a metal salt or metal oxide selected from zinc oxide, magnesium oxide, zinc octoate, zinc stearate or mixtures thereof, 0.5 to 5 wt. % of one or more fillers or pigments selected from barium sulfate, iron oxide, carbon black, calcium carbonate or mixtures thereof, 91 to 40 wt. % water.

The condensation products of phenols with formaldehyde, which are known per se, are used as the phenolic resin here, the phenolic resin being a resol and/or novolak resin and optionally being rendered hydrophobic by the incorporation of alkylated phenols. These phenolic resins are either liquid and highly viscous, but they can also be used in the form of their highly concentrated aqueous solutions or optionally dissolved in small quantities of water-miscible solvents, such as low alkyl alcohols, low ketones and the like.

Aromatic nitroso compounds are another important component of the bonding agents according to the invention. Suitable aromatic nitroso compounds contain at least 2 nitroso groups per aromatic ring. Thus, for example, m- and p-dinitrosobenezene and the dinitroso compounds of naphthalene, anthracene or diphenyl are suitable. Their aromatic rings can contain other substituents selected from alkyl, alkoxy, cycloalkyl, aryl, arylnitroso and similar groups. The following can be mentioned as specific examples of compounds: m-dinitrosobenzene, p-dinitrosobenzene, m-dinitrosonaphthalene, p-dinitrosonaphthalene, 2,5-dinitroso-p-cumene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene. p-Dinitrosobenzene, which is known to be present in oligomeric or polymeric form, is most particularly preferred. A particularly advantageous production process for poly-p-dinitrosobenzene by oxidation of p-benzoquinone dioxime in situ with an alkali iodide and hydrogen peroxide is mentioned in WO 00/375539.

Another essential component of the aqueous bonding agents according to the invention are polyvinyl alcohols, which are known to be produced by hydrolysis of homo- or copolymers of vinyl acetate. The percentage of the hydroxyl groups of the polyvinyl alcohol, based on the acetate groups originally present, can be between 40 and 99% here, degrees of saponification of between 75 and 90% being particularly preferred. In addition to the particularly preferred saponification products of polyvinyl acetate, saponification products of copolymers of vinyl acetate with vinyl butyrate, ethylene-vinyl chloride copolymers, vinyl acetate-acrylate copolymers and ethylene-vinyl acetate copolymers (EVA) can also be used.

In the above copolymers, the proportion of vinyl acetate in mole % of the total copolymer should be more than 30 mole %, preferably more than 50 mole % and in particular more than 70 mole %. The above-mentioned degrees of hydrolysis based on the vinyl acetate groups originally present also apply to these polyvinyl alcohol copolymers. The polyvinyl alcohols have a molecular weight of between 14,000 and 100,000; the level of the molecular weight is of only minor importance for the adhesion result achieved. The viscosity of the entire bonding agent composition can be influenced by the molecular weight of the polyvinyl alcohol or by the degree of hydrolysis, and the processing properties can be controlled as a result. A high molecular weight and a high degree of hydrolysis lead to highly viscous compositions, a low molecular weight and a low degree of hydrolysis to a low viscosity.

It may be necessary to take up the phenolic resin in particular in water-soluble organic solvents in order to obtain a homogeneous bonding agent dispersion or solution. Alkyl alcohols with up to 3 carbon atoms (in particular ethanol)or low ketones such as acetone, methyl ethyl ketone and the like are particularly suitable as water-soluble solvents.

In addition, the bonding agent compositions according to the invention can also contain conventional adhesion-improving fillers, carbon black in quantities of 0.5 to 5 wt. % or metal oxides, such as zinc oxide, magnesium oxide, or metal salts, such as zinc octoate or zinc stearate, in quantities of 0.5 to 5 wt. % being particularly suitable. In addition, other pigments or fillers selected from barium sulfate, iron oxide, calcium carbonate or mixtures thereof can be incorporated. The aqueous bonding agents according to the invention are suitable as a one-coat application on metal substrates such as iron, stainless steel, lead, aluminum, copper, brass, bronze, MONEL metals, nickel, zinc and for pretreated metals such as phosphatized or galvanized steel for bonding with common vulcanizable elastomers, particularly EPDM rubbers.

The bonding agents are applied on to the substrate surfaces by conventional means, e.g. by dipping, spraying, brushing and the like. After coating, the substrate surfaces are dried, the rubber mixture to be vulcanized is applied and the composite structures produced in this way are then heated by conventional means in order to bring about the vulcanization of the rubber.

The bonding agents according to the invention have the following advantages compared with the bonding agent systems of the prior art:

- better process control is possible owing to the one-coat application and the composite systems have less variability associated with defects,
- the adhesion of the coating to the vulcanized elastomer is still excellent even after lengthy temporary storage of the coated metal; it is assumed that, among other things, this is associated with the fact that the active adhesive substances, such as the nitroso-aromatic compounds, remain constant in the bonding agent layer and cannot migrate into the primer layer and/or to the interfaces,
- the bonding agent system can be applied on to pre-cut and shaped metal substrates since, as a result of being applied in one step and of the absence of large quantities of volatile organic solvents, the application apparatus is simpler so that applications other than direct onto the coil are possible,
- this leads to the fact that, among other things, in the case of pre-cut and shaped metal substrates, even the edge areas can be coated,
- as a result, the overall application of the rubber-metal bonding agent becomes more economical than in the processes according to the prior art.

The rubber extruded onto the substrate can be vulcanized by the conventional methods, e.g. by UHF (ultra-high frequency) heating, IR heating, conventional oven heating or a combination of the three processes.

The invention will be explained in more detail below using a few specific examples of embodiments, the choice of the examples not being intended to represent any restriction of the scope of the subject of the invention; they merely show, by way of example, the mode of action of the one-coat bonding agents to be used according to the invention.

EXAMPLE

An aqueous bonding agent was produced from the following components:

poly-p-dinitrosobenzene 5 wt. %,

BAKELITE KP 781 phenolic resin (Bakelite) 10 wt. %, ethanol 10 wt. %,

MOWIOL 18/88 polyvinyl alcohol (Clariant) 5 wt. %,
ELFTEX 125 carbon black (Cabot) 3 wt. %,
HANSA extra zinc oxide (Lehmann & Voss) 3 wt. %,
water 64 wt. %

The phenolic resin was dissolved as a 50% solution in ethanol, the polyvinyl alcohol was dissolved as a 10% solution in water and the other components were then added, with stirring, and subsequently ground in a pearl mill until a particle size of <50 µm was achieved.

Steel sheet was coated with the bonding agent composition and dried, an EPDM mixture, as quoted, for example, in WO 90/12847, page 24, was then applied and the vulcanization was then performed at normal pressure for 5 min at 180° C.

The vulcanized rubber mixture displayed very good dry adhesion and a tear strength of >30 daN/in with a material rupture in the rubber. The type of failure was 100 R; after the boiling water test the tear strength was ≧90 R. These measurements were carried out in accordance with ASTM D 429, method D.

Coated metal parts could be stored at room temperature for more than 12 weeks before a rubber mixture was vulcanized onto them. Even composite systems produced in this way displayed the same positive result as freshly coated substrates.

What is claimed is:

1. An aqueous bonding agent comprising:
    a) at least one phenolic resin;
    b) one or more polyfunctional aromatic nitroso compounds; and
    c) 2 to 10 wt. % polyvinyl alcohol;
    wherein said aqueous bonding agent is substantially free from halogen-containing polymers.

2. The aqueous bonding agent according to claim 1, additionally comprising at least one component selected from the group consisting of metal salts, metal oxides, fillers, pigments, and mixtures thereof.

3. The aqueous bonding agent according to claim 1, wherein the polyfunctional aromatic nitroso compound is selected from the group consisting of 1,3-dinitrosobenzene, 1,4-dinitrosobenzene, m-dinitrosonaphthalene, p-dinitrosonaphthalene, and oligomers, polymers, and mixtures thereof.

4. A process for producing a metal substrate coated with a rubber-metal bonding agent layer comprising the following process steps:
    a) applying an aqueous bonding agent according to claim 1 onto a metal substrate to form a coating;
    b) drying and/or curing the coating to form a bonding agent layer.

5. The process of claim 4 wherein said metal substrate does not have a primer thereon.

6. The process of claim 4 comprising the following additional process steps after step (b):
    c) cutting and/or shaping the metal substrate having the bonding agent layer coated thereon;
    d) applying a rubber mixture onto the metal substrate coated with the bonding agent layer; and
    e) vulcanizing the rubber mixture.

7. The process of claim 6 wherein final curing of the bonding agent layer is carried out during step (e).

8. The process of claim 6 wherein step (d) is carried out by extruding said rubber mixture onto the metal substrate.

9. The process of claim 8 wherein said rubber mixture is shaped to provide a final profile.

10. The process of claim 4 wherein said metal substrate is cut before step
    a) and wherein after step
    b) the following additional process steps are performed;
    c) the metal substrate coated with said bonding agent layer is shaped;
    d) a rubber mixture is applied onto said metal substrate coated with said bonding agent layer; and
    e) the rubber mixture is vulcanized.

11. The process of claim 10 wherein final curing of the bonding agent layer is carried out during step (e).

12. The process of claim 10 wherein step (d) is carried out by extruding said rubber mixture onto the metal substrate.

13. The process of claim 12 wherein said rubber mixture is shaped to provide a final profile.

14. The process of claim 4 wherein said metal substrate is comprised of steel or aluminum.

15. The process of claim 4 wherein said metal substrate is a metal coil.

16. The process of claim 4 wherein said bonding agent layer has a thickness of 1 to 8 µm when dry or cured.

17. The process of claim 4 wherein said metal substrate is heated to a temperature of between 60 and 150° C. during step (b).

18. An aqueous bonding agent comprising:
    a) 4 to 15 wt. % phenolic resin;
    b) 2 to 10 wt. % polyfunctional aromatic nitroso compound;
    c) 2 to 10 wt. % polyvinyl alcohol;
    d) 0 to 15 wt. % of a water-soluble solvent as solubilizer;
    e) 0.5 to 5 wt. % of a metal salt or metal oxide selected from the group consisting of zinc oxide, magnesium oxide, zinc octoate, zinc stearate and mixtures thereof;
    f) 0.5 to 5 wt. % of one or more fillers or pigments selected from the group consisting of barium sulfate, iron oxide, carbon black, calcium carbonate and mixtures thereof;
    g) 91 to 40 wt. % water;
    wherein said aqueous bonding agent is substantially free from halogen-containing polymers.

19. A process for producing a metal substrate coated with a rubber-metal bonding agent layer comprising the following process steps:
    a) applying an aqueous bonding agent according to claim 18 onto a metal substrate to form a coating;
    b) drying and/or curing the coating to form a bonding agent layer.

20. The process of claim 19 comprising the following additional process steps after step (b):
    c) cutting and/or shaping the metal substrate having the bonding agent layer coated thereon;
    d) applying a rubber mixture onto the metal substrate coated with the bonding agent layer; and
    e) vulcanizing the rubber mixture.

21. The process of claim 19 wherein said metal substrate is cut before step (a) and wherein after step (b) the following additional process steps are performed:
    c) shaping the metal substrate coated with said bonding agent layer;
    d) applying a rubber mixture is onto said metal substrate coated with said bonding agent layer; and
    e) vulcanizing the rubber mixture.

* * * * *

UNITED STATES PATENT AND TRADEMARK OFFICE
CERTIFICATE OF CORRECTION

PATENT NO. : 6,902,760 B2
DATED : June 7, 2005
INVENTOR(S) : Wefringhaus et al.

It is certified that error appears in the above-identified patent and that said Letters Patent is hereby corrected as shown below:

<u>Title page,</u>
Insert Item -- [30] Foreign Application Priority Data
      December 14, 2000 (DE) .............100 62 266 --.

Signed and Sealed this

Twenty-fifth Day of April, 2006

JON W. DUDAS
*Director of the United States Patent and Trademark Office*